Oct. 3, 1950 S. FREEDMAN ET AL 2,524,165

DIRECT CURRENT AMPLIFIER

Filed Sept. 18, 1945 2 Sheets-Sheet 1

INVENTORS
Samuel Freedman
Giusto Fonda Bonardi
BY Ralph L. Chappell
ATTORNEY

Oct. 3, 1950 S. FREEDMAN ET AL 2,524,165

DIRECT CURRENT AMPLIFIER

Filed Sept. 18, 1945 2 Sheets-Sheet 2

INVENTORS
Samuel Freedman
Giusto Fonda Bonardi
BY Ralph L. Chappell
ATTORNEY

Patented Oct. 3, 1950

2,524,165

UNITED STATES PATENT OFFICE 2,524,165

DIRECT-CURRENT AMPLIFIER

Samuel Freedman, United States Navy, and Giusto Fonda Bonardi, Manhattan Beach, Calif.

Application September 18, 1945, Serial No. 617,136

2 Claims. (Cl. 179—171)

This invention relates to electronic systems and apparatus for amplification of a steady direct current and slowly fluctuating direct currents.

A principal object of this invention is to provide a method of and an electronic system and apparatus for amplification, indication, and measurement of direct current and slowly fluctuating direct currents with improved stability and dependability not readily heretofore attained with conventional direct-current amplifiers.

Previous circuit arrangements and apparatus for this purpose depended upon direct coupling between the output of one vacuum tube stage and the input of the next stage, and the direct current or varying voltage under test was directly applied to the tubes. Such arrangements often resulted in false and erratic indications due to pickup of spurious currents and to the occurrence of small plate or filament voltage fluctuation in the vacuum tube circuits themselves.

Greater stability and dependability, as well as increased voltage amplification, are obtained by means of this invention by incorporating certain conventional techniques, such as, for example, employing the principles of intermediate-frequency stages, as used in certain radio receiving systems, between the various amplifying sections.

More particularly the amplification of direct current is obtained with the present invention by generating an alternating current by means of a suitable oscillator, and modulating this alternating current with the direct current, or other signal, where amplification is desired. The result is an amplitude-modulated signal with the direct current as its envelope of modulation. This signal is then amplified by means of a suitable high-gain alternating-current amplifier, detected, and translated.

Further objects and advantages of this invention, as well as apparatus, arrangement, operation and the method used, will be apparent from the following description and claims in connection with the accompanying drawings in which:

Figure 1:
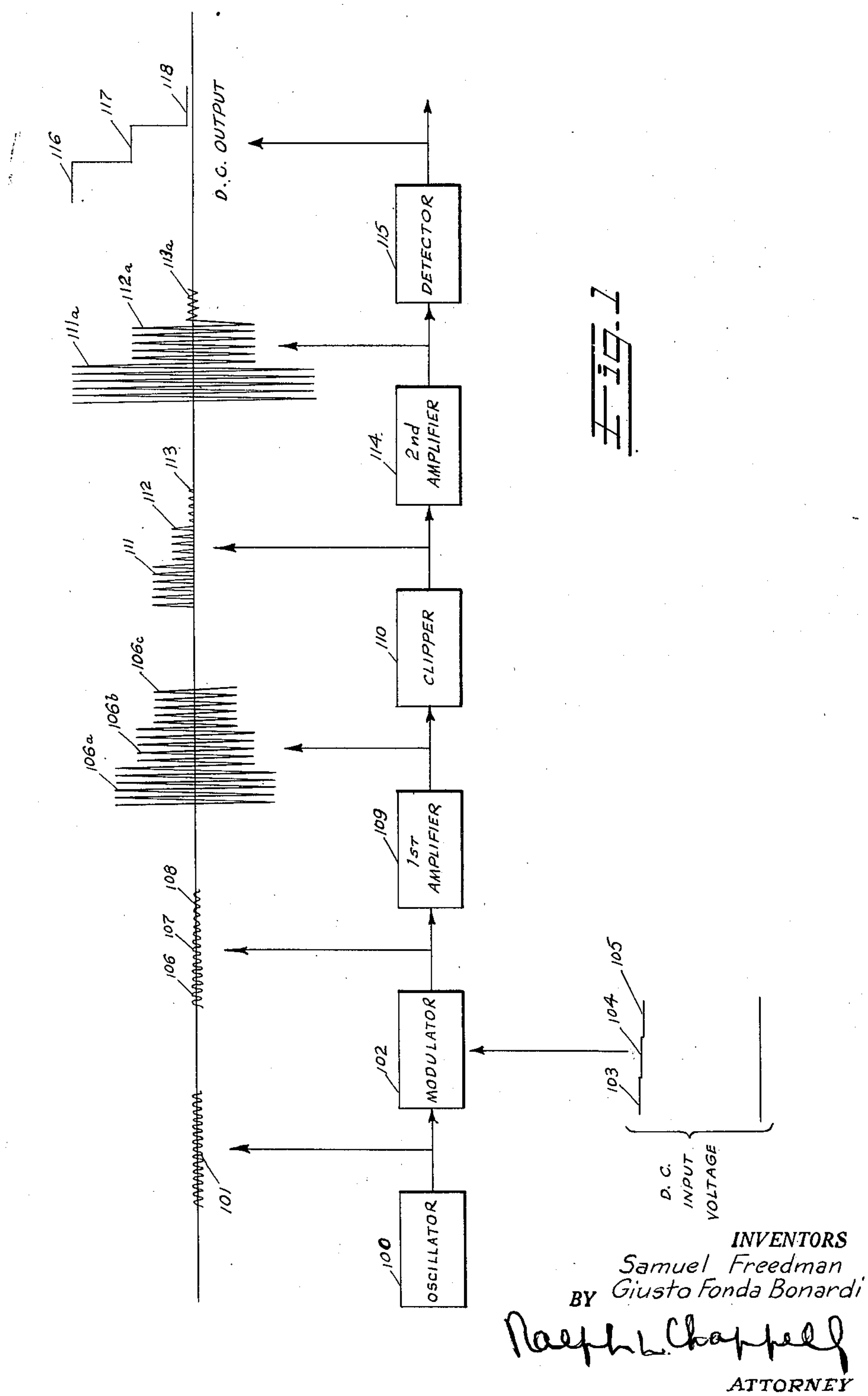
Fig. 1 is a schematic block diagram of the major components of the system involved.
Figure 2:
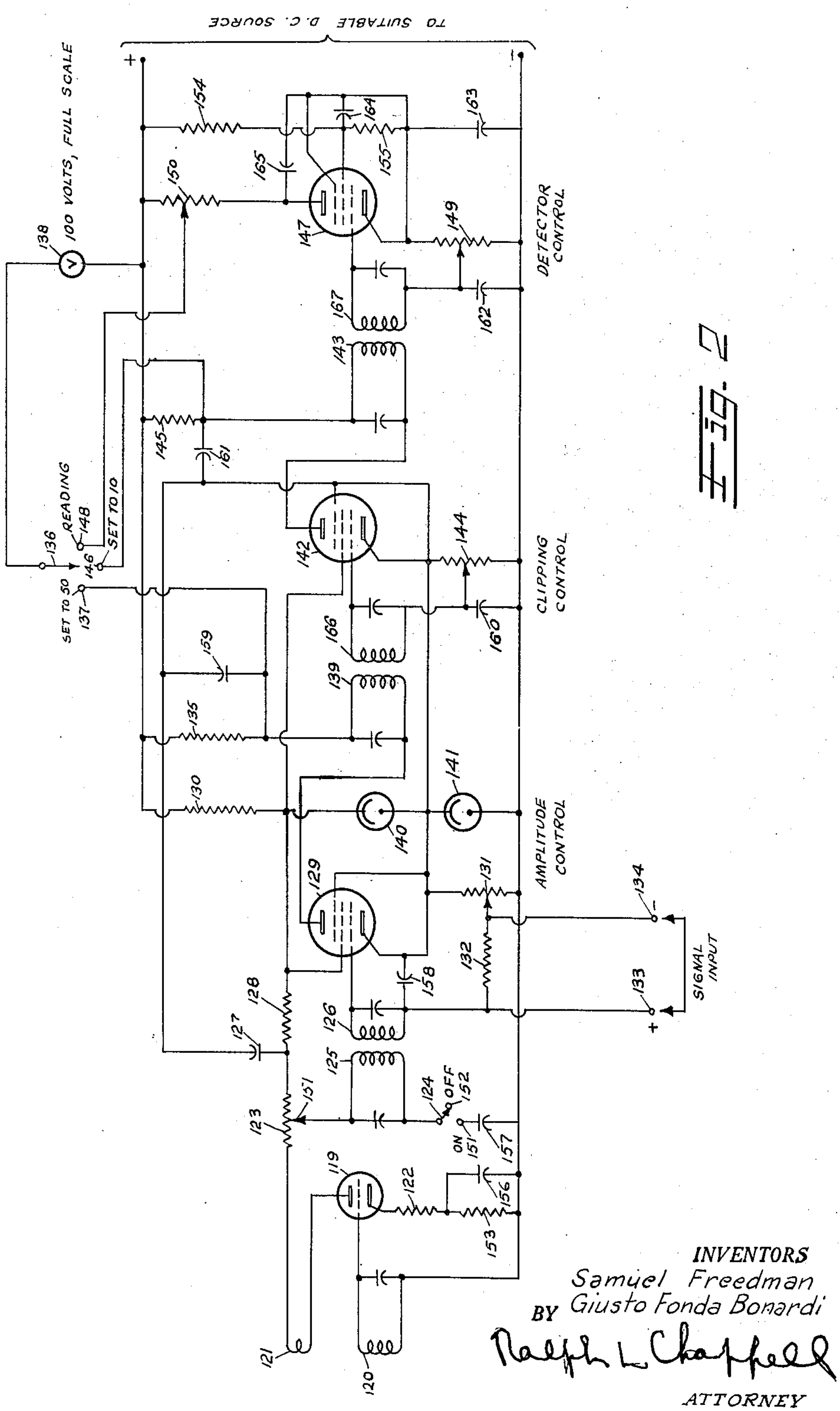
Fig. 2 is a schematic diagram of the complete system, excepting the sources of energy.

In Fig. 1, the major block components are shown in sequence similar to the actual circuit indicated in Fig. 2. In Fig. 1 the oscillator 100 generates a uniform alternating current of the form indicated at 101, which current is fed to the modulator 102 and there becomes modulated, for example, by a series of applied direct-current input voltages of the forms shown at 103, 104 and 105. The output of the modulator is of the form indicated by stepped curves 106, 107 and 108. This output is then fed to the first amplifier 109 of which the output is indicated by curves 106*a*, 106*b* and 106*c*. The latter output now passes through clipper stage 110 and emerges as shown by half-wave curves 111, 112 and 113. This output is then in turn fed into the second amplifier 114 and emerges as indicated by curves 111*a*, 112*a* and 113*a*. The amplified output is then fed into detector stage 115 where it is rectified and emerges as D. C. indicated at 116, 117 and 118. Three values of direct-current input voltages 103, 104 and 105 are shown by way of example instead of a single D. C. voltage.

As shown in Fig. 2, the oscillator 100 may consist of a vacuum tube 119 of any suitable type for generating oscillations of small but constant amplitude. Any suitable frequency may be employed for this purpose and the practice followed for interstage coupling by means of tuned circuits commonly used in intermediate or radio frequency interstage coupling techniques may be used. The amplitude stability is, however, very important. The circuit of this oscillator includes a tuned grid circuit 120 in inductive relationship with plate circuit coil 121 arranged to provide the necessary feedback for generating oscillations. The oscillator may, if desired, consist of any other convenient type of circuit. The proper amount of negative feedback is injected in the cathode circuit by means of the resistor 122. This negative feedback tends to keep the amplitude of the oscillation small and to increase the amplitude stability. The oscillator control potentiometer 123 in the plate circuit provides means for adjusting the amplitude of the output without affecting the stability of the oscillator. Switch 124 permits switching the coupling circuit "on" and "off" as desired when adjustments are being made. The coupling circuit is of the double tuned type employing coupling coils 125 and 126. This coupling should be sufficiently loose so as to prevent the small load changes, due to adjustments of the circuits that follow, from affecting the amplitude of the oscillations. The tuned circuits are similar to conventional intermediate frequency circuits and can be tuned, trimmed, coupled, and shielded as currently used in intermediate-frequency techniques. The filter section, comprising condenser 127 and the resistor 128 in the plate circuit, assists in keeping constant the amplitude of the oscillation.

The modulator consists of a suitable vacuum tube 129 having a remote cutoff characteristic that permits the variation of its output amplitude to be proportional to the variations of grid bias. This occurs when the characteristic curve closely follows the square law, as then the current is proportional to the square of signal voltage. The average value of grid bias should therefore be kept near that point. This means that for best results the adjustment of the modulator should be maintained at the point of best linearity, although this adjustment may not always be the same as that required for suitable amplification of the small voltage fluctuations; the amplifier control potentiometer 131, which may cover all values of D. C. input signals from 0 to 100 volts, is therefore provided. A resistor 132 in the input D. C. circuit provides a D. C. connection for the grid during the preliminary adjustment when no D. C. signal is present at the input terminals 133 and 134. The resistor 135 in the plate circuit of the tube 129, in connection with the lever of switch 136 in position 137, makes it possible to adjust the amplifier control potentiometer 131 until the operating point of the tube 129 falls in the square law position of its characteristic curve. This particular portion of the circuit is adjusted until the voltmeter 138 reads 50 volts indicating that the right current corresponding to the proper bias is flowing through tube 129. This tube, in addition to functioning as a modulator, is also the first amplifier (indicated as 109 in Figure 1) being connected to the tuned output coupling coil 139.

In the voltage regulating position of the circuit two voltage regulating vacuum tubes 140 and 141, of any suitable type, provide good regulation of the cathode voltage against the amplifier control potentiometer 131 as well as good regulation of the screen voltage of tube 129. The resistor 130, in series with the voltage regulating tubes 140 and 141 in the B source positive supply line, is the ballast resistor. This voltage regulating section is also connected with the stage that follows it to provide a similar control of the cathode and screen voltage of the clipper tube 142.

Since the best operating point of the modulator tube 129, with respect to linearity, does not necessarily correspond with the best operating point with respect to the gain of small fluctuations, a clipper tube 142 is used to eliminate everything except the abnormal amplitude fluctuations which represent the desired signal. The use of a sharp cutoff pentode tube 142, which may be of a 6SJ7 or other suitable type, provides a sharp clipping of the input oscillations if the grid bias is adjusted beyond plate cutoff. In this case only a part of the positive peak of each oscillation allows plate current to flow. The tuned plate circuit 143 functions as a class C amplifier, thereby permitting tube 142 to function as the second amplifier as indicated by 114 in the block diagram of Figure 1. The grid bias is adjusted by means of a clipping control potentiometer 144. The resistor 145, in the plate circuit of tube 142, and in connection with meter switch 136 in position 146, aids in determining the proper bias. In this position of the circuit the bias will be about 10 volts, although the optimum value should be determined by experimentation.

The detector 115 consists, as shown in Figure 2, of a biased detector tube 147, such as a pentode tube of the 6SJ7 or other suitable type, to detect and cause the amplified D. C. signal to be indicated on the meter 138 when switch lever 136 is connected to position number 148. Detector control potentiometer 149 is used to adjust the current to zero with zero signal; this condition is indicated on the meter 138 when switch lever 136 is turned to contact 148 in the "Reading" position. If greater sensitivity is desired the meter 138 may be included in a bridge circuit or in connection with other suitable modifications thereof, since a bridge circuit is more sensitive than a simple meter connection.

This direct current amplifier as described up to the last stage, but not including the detector circuit, may also be used in connection with the controlled voltage divider circuit described in copending application, Serial Number 608,243, filed August 1, 1945, in order to utilize the advantages of the controlled voltage divider with small D. C. signals. In this case detection is provided by the controlled voltage divider system itself. The meter 138 may be calibrated by checking with known signals in the event an actual value is desired instead of merely an indication of change in D. C. voltage. This may be accomplished by feeding a signal of known value to the D. C. input terminals 133 and 134 of the amplifier 129 and adjusting the meter control potentiometer 150.

*Alignment instructions*

(*a*) Move switch 136 to the "Set to 50" position 137.

(*b*) Move switch 124 to the "On" position 151.

(*c*) Move lever 151 of oscillator control potentiometer 123 to the extreme right and then move it slightly back to the left.

(*d*) Adjust amplifier control potentiometer 131 until meter 138 reads "50."

(*e*) Move switch lever 124 to the "Off" position 152.

(*f*) Move switch lever 136 to the "Set to 10" position 146.

(*g*) Adjust the clipping control potentiometer 144 until meter 138 reads "Zero." (Caution: Do not go below zero; stop when the meter reaches zero.)

(*h*) Move switch lever 124 to the "On" position.

(*i*) Adjust lever 151 of oscillator control potentiometer 123 until meter 138 reads "10."

(*j*) Move switch lever 136 to the "Reading" position 148.

(*k*) Move switch lever 124 to "Off" position 152.

(*l*) Adjust detector control potentiometer 149 until meter 138 reads "Zero." (Use same caution as for (*g*) above.)

(*m*) Move switch lever 124 to the "On" position.

The D. C. amplifier should now be ready to function. Operations (*a*) to (*m*) should be made before the amplifier is used as they represent the basic alignment of the amplifier. They need not be repeated every time, and they should be made with no D. C. signal in the input terminals 133 and 134. The potentiometers involved in operations (*g*), (*i*) and (*l*) should not again be touched except when checking the entire alignment periodically by repeating all of the above operations.

*Operating instructions*

(*aa*) Move switch lever 136 to the "Set to 50" position 137.

(*bb*) Move the amplifier control potentiometer lever to the bottom of resistor 131.

(*cc*) Connect the circuit under test to the "Input" terminals 133 and 134, observe the right polarity as no reading is possible with reversed polarity.

(*dd*) Move the amplifier control potentiometer lever up resistor 131 until the meter 138 again reads "50." (Caution: Use with care, as this position is reached sooner than in operation (*d*) above.)

(*ee*) Move switch lever 136 to the "Reading" position 148.

(*ff*) Adjust the reading control potentiometer 150 until meter 138 reads "50." Now any increase in the D. C. signal under test will increase the reading on meter 138, while any decrease in the signal will decrease the reading on the meter a proportional amount.

The meter 138 may be calibrated by checking with input signals of known strength in the event an actual measure of the signal is required instead of only an indication of its D. C. voltage change.

The maximum D. C. signal input voltage of the apparatus as indicated is 100 volts. The meter 138 may be a volt meter with 100 volts full scale deflection and having an internal resistance as high as possible.

The values of all apparatus are for example only, and it is to be understood that any other suitable apparatus and values may be substituted as found necessary or desirable.

It will be readily understood that for some purposes the operation of this invention may be effected by omitting the clipper stage 110, and second amplifier stage 114, of Figure 1 and the corresponding apparatus in Figure 2.

The title of this application has been selected for identification purposes only and it is not to be construed as fully describing this invention, or in limitation of its scope and application.

The apparatus and values listed hereinafter are also by way of example only and it is to be understood that other apparatus and other suitable values may be substituted as desired or required.

*List of parts, values and functions*

| Symbol | Value | Functions |
|---|---|---|
| | RESISTORS | |
| 122 | 1,000 Ohms (1 watt) | Un-by-passed cathode resistor of oscillator tube 119. |
| 128 | 3,000 Ohms (1 watt) | Filter resistor in the plate circuit of oscillator 119. |
| 130 | 4,000 Ohms (2 watts) | Ballast resistor for voltage regulating section. |
| 132 | 2 Megohms (½ watt) | Input D. C. connection to modulator tube 129. |
| 135 | 10,000 Ohms (2 watts) | Plate resistor of modulator tube 129. |
| 145 | 10,000 Ohms (2 watts) | Plate resistor of clipper tube 142. |
| 153 | 1,000 Ohms (1 watt) | By-passed cathode resistor of oscillator tube 119. |
| 154 | 5,000 Ohms (4 watts) | Screen voltage divider of detector tube 147. |
| 155 | 5,000 Ohms (4 watts) | Cathode voltage divider of detector tube 147. |

| Symbol | Value | Functions |
|---|---|---|
| | POTENTIOMETERS | |
| 123 | 10,000 Ohms (1 watt) | Oscillator control plate output potentiometer of oscillator tube 119. |
| 131 | 50,000 Ohms (2 watts) | Amplitude control cathode potentiometer of modulator tube 129. |
| 144 | 1 Megohm (1 watt) | Clipping Control cathode potentiometer of clipper tube 142. |
| 149 | 5,000 Ohms (4 watts) | Detector Control cathode potentiometer of detector tube 147. |
| 150 | 50,000 Ohms (2 watts) | Meter Control plate potentiometer of detector tube 147. |
| | CONDENSERS | |
| 127 | .05 mfd | Filter condenser in the plate circuit of oscillator tube 119. |
| 156 | .01 mfd | Cathode by-pass of oscillator tube 119. |
| 157 | .1 mfd | Output tuned circuit by-pass of oscillator tube 119. |
| 158 | .005 mfd | Grid by-pass of modulator tube 129. |
| 159 | .05 mfd | Plate by-pass of modulator tube 129. |
| 160 | .1 mfd | Cathode by-pass of clipper tube 142. |
| 161 | .05 mfd | Plate-screen by-pass of clipper tube 142. |
| 162 | .1 mfd | Grid by-pass of detector tube 147. |
| 163 | 4.0 mfd | Cathode by-pass of detector tube 147. |
| 164 | 4.0 mfd | Screen by-pass detector tube 147. |
| 165 | .005 mfd | Plate by-pass of detector tube 147. |
| | VACUUM TUBES | |
| 119 | 6SF6 tube | Oscillator. |
| 129 | 6SK7 tube | Modulator and First amplifier. |
| 140 | VR105 | Voltage regulator for screen grid of tubes 129 and 142. |
| 141 | VR105 | Voltage regulator for cathodes of tubes 129 and 142. |
| 142 | 6SJ7 tube | Clipper and Second amplifier. |
| 147 | 6SJ7 tube | Detector. |
| | TUNED CIRCUITS | |
| 120 | Oscillator-grid tuned circuit. | |
| 125 | Oscillator output tuned circuit. | |
| 126 | Modulator input tuned circuit. | |
| 139 | Modulator output tuned circuit. | |
| 143 | Clipper output tuned circuit. | |
| 166 | Clipper input tuned circuit. | |
| 167 | Detector input tuned circuit. | |

It is to be understood that various modifications and changes may be made in this invention without departing from the spirit and scope thereof as set forth in the appended claims.

What is claimed is:

1. The combination, in a system for amplifying and measuring direct current, of means for generating oscillations, means for modulating said oscillations by the direct current to be amplified, means for amplifying said modulated oscillations, means for eliminating the negative half cycle portions of said amplified modulated oscillations, means for amplifying the positive half cycles, and means for rectifying and translating the resulting component of said half waves after amplification.

2. The combination, in a system for amplifying direct current, of a vacuum tube oscillator for generating oscillations of substantially uniform amplitude, a vacuum tube modulator whereby said oscillations are modulated by the direct current to be amplified and measured, a vacuum tube amplifier for amplifying said modulated oscillations, means for rectifying the amplified oscillations, thereby to provide a varying signal of predetermined polarity, an amplifier for amplifying said polarized varying signal, and a vacuum tube detector for detecting and rectifying the amplified version of said polarized signal.

SAMUEL FREEDMAN.
GIUSTO FONDA BONARDI.

REFERENCES CITED

The following references are of record in the file of this patent:

UNITED STATES PATENTS

| Number | Name | Date |
|---|---|---|
| 1,428,156 | Espenschied | Sept. 5, 1922 |
| 2,320,476 | Schrader et al. | June 1, 1943 |